(12) United States Patent
Patel (10) Patent No.: US 7,222,793 B2
(45) Date of Patent: May 29, 2007

(54) ARRANGEMENT AND METHOD OF IMAGING ONE-DIMENSIONAL AND TWO-DIMENSIONAL OPTICAL CODES AT A PLURALITY OF FOCAL PLANES

(75) Inventor: Mehul Patel, Fort Salonga, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 113 days.

(21) Appl. No.: 10/703,116

(22) Filed: Nov. 6, 2003

(65) Prior Publication Data

US 2005/0006478 A1   Jan. 13, 2005

Related U.S. Application Data

(60) Provisional application No. 60/485,685, filed on Jul. 9, 2003.

(51) Int. Cl.
*G02B 26/08* (2006.01)
(52) U.S. Cl. ............ 235/462.22; 235/454; 235/462.01; 235/462.4
(58) Field of Classification Search ............ 235/462.22, 235/462.1, 462.11, 462.24, 462.32, 462.36, 235/462.41, 454, 462.4
See application file for complete search history.

(56) References Cited

U.S. PATENT DOCUMENTS

| 5,473,149 | A | * | 12/1995 | Miwa et al. ............ 235/462.41 |
| 5,780,834 | A | * | 7/1998 | Havens et al. ............ 235/462.1 |
| 5,959,283 | A | * | 9/1999 | Tawara et al. ......... 235/462.01 |
| 6,000,619 | A | * | 12/1999 | Reddersen et al. .... 235/462.45 |
| 6,006,990 | A | * | 12/1999 | Ye et al. ...................... 235/454 |
| 6,060,722 | A | * | 5/2000 | Havens et al. .............. 250/566 |
| 6,234,396 | B1 | * | 5/2001 | Tawara ................... 235/472.01 |
| 2003/0226895 | A1 | | 12/2003 | Havens et al. |
| 2004/0004125 | A1 | | 1/2004 | Havens et al. |
| 2004/0004128 | A1 | | 1/2004 | Pettinelli et al. |

FOREIGN PATENT DOCUMENTS

WO   WO 03/104854 A2   12/2003

* cited by examiner

*Primary Examiner*—Steven S. Paik
(74) *Attorney, Agent, or Firm*—Carter DeLuca Farrell & Schmidt, LLP (57) ABSTRACT

A non-complex imaging arrangement is aligned along an imaging axis. A mirror assembly is configured to reflect an image from an optical axis, which intersects the imaging axis, toward the optics assembly. The imaging arrangement includes at least one fixed image sensor for imaging thereon an optical code or target, such as a one-dimensional or two-dimensional barcode symbol, or label, signature, marking, picture, etc. The imaging arrangement provides an extended working range of approximately 5–102 cm. The imaging arrangement is capable of being incorporated within a barcode imager to provide a non-complex barcode imager having an extended working range which is comparable to or greater than the working ranges of conventional image-based barcode imagers.

40 Claims, 6 Drawing Sheets

ARRANGEMENT AND METHOD OF IMAGING ONE-DIMENSIONAL AND TWO-DIMENSIONAL OPTICAL CODES AT A PLURALITY OF FOCAL PLANES

PRIORITY

The present application claims priority to a U.S. Provisional Application filed on Jul. 9, 2003 and assigned U.S. patent application Ser. No. 60/485,685, incorporated herein in its entirety.

BACKGROUND OF THE INVENTION

1. Field of the Invention

The present invention relates to the field of imaging, and specifically to an imaging arrangement and barcode imager for imaging an optical code or target at a plurality of focal planes.

2. Description of the Related Art

CCD or CMOS-based imaging devices, such as conventional barcode imagers, generally have limited working ranges on the order of 5–61 cm (~2–24 inches). Furthermore, the aiming axis is often misaligned with the imaging axis of the imaging device. In many cases, the imaging device is designed to be handheld or at least moveable within a given area, thus compensating, somewhat, for the limited working range and skewed axis. However, the operator is still required to position the imaging device within the proper range and angle to produce an adequately sharp, i.e., substantially focused image. This may require a trial and error approach on the part of the operator in order to obtain the proper distance and angle from the target to be imaged.

In applications where the imaging device is kept stationary (e.g., fixed mount applications), such as in an assembly line where the imaging device is generally fixed for imaging barcode symbols on objects being moved along the assembly line, the conventional working range (i.e., 5–61 cm) is generally acceptable. In many applications where an increased working range is necessary, expensive and complex imaging arrangements having state-of-the-art automatic focus systems, such as zoom capabilities, are generally incorporated within or used in conjunction with barcode imagers to increase their working range. However, such imaging arrangements, besides being expensive, generally require constant maintenance. Therefore, when an application calls for imaging and decoding one-dimensional and two-dimensional barcode symbols, these imaging arrangements do not compete well in the marketplace against laser-based barcode readers which have comparable or even greater working ranges, and generally are less expensive.

SUMMARY OF THE INVENTION

According to the above, there exists a need in the field of imaging for an imaging arrangement that can be incorporated within an image-based barcode imager for imaging a one-dimensional and two-dimensional barcode symbol, or label, marking, picture, etc., at one of a plurality of focal planes traversing an optical axis and along an extended working range of the imaging arrangement.

Accordingly, an aspect of the present invention is to provide an imaging arrangement for imaging an optical code or target, such as a one-dimensional or two-dimensional barcode symbol, or label, marking, picture, etc., at a plurality of focal planes traversing an optical axis and along an extended working range of the imaging arrangement.

Another aspect of the present invention is to provide an imaging arrangement for imaging an optical code or target, such as a one-dimensional or two-dimensional barcode symbol, or label, marking, picture, etc., having an extended working range comparable to, or even greater than, conventional laser-based barcode readers and image-based barcode imagers.

Another aspect of the present invention is to provide an image-based barcode imager incorporating an imaging arrangement and having an extended working range comparable to or even greater than conventional laser-based barcode readers and image-based barcode imagers.

Yet another aspect of the present invention is to provide an inexpensive image-based barcode reader for reading one-dimensional and two-dimensional symbols, labels, markings, pictures, etc. and performance levels which are equivalent to or exceed the performance levels associated with conventional laser-based optical code scanners designed for imaging and decoding similar symbols.

The imaging arrangement and barcode imager of the present invention achieve these and other aspects by providing an extended working range (i.e., greater than 61 cm or 24 inches) of approximately 5–102 cm (~2–40 inches) compared to a typical working range of approximately 5–61 cm (~2–24 inches) for conventional barcode imagers. The imaging arrangement and image-based barcode imager of the present invention do not require complex automatic-focusing systems. As such, the performance of the image-based barcode imager of the present invention in imaging and decoding one-dimensional and two-dimensional barcode symbols (and in imaging and processing labels, markings, pictures, etc.) is comparable to or even greater than conventional laser-based barcode readers and image-based barcode imagers.

BRIEF DESCRIPTION OF THE DRAWINGS

Various embodiments of the invention will be described herein below with reference to the figures wherein.

DETAILED DESCRIPTION OF PREFERRED EMBODIMENTS

The imaging arrangements shown by the figures and described herein are suitable for imaging various optical codes or targets, such as labels, markings, pictures, etc., and especially suitable for imaging one-dimensional and two-dimensional barcode symbols, such as a Universal Product Code (UPC) barcode, and have an extended working range (i.e., greater than 61 cm or 24 inches) of approximately 5 cm (~2 inches) to 102 cm (~40 inches).

Figure 1:
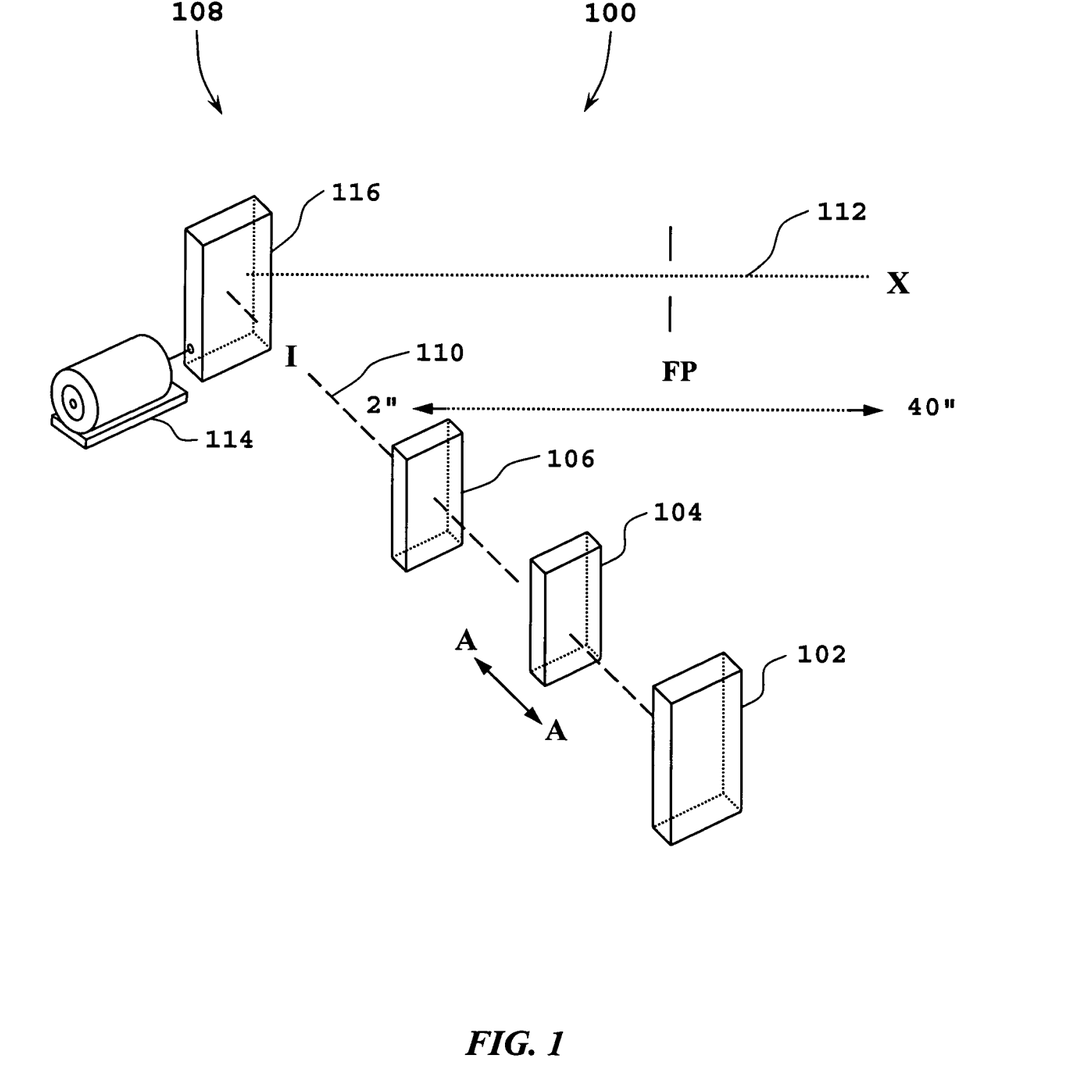
FIG. 1 is a schematic diagram illustrating an imaging arrangement in accordance with an embodiment of the present invention.

Referring initially to FIG. 1, an imaging arrangement in accordance with the present invention is illustrated. Imaging arrangement 100 includes an image sensor 102, an optical element 104, an optics assembly 106 and a mirror assembly 108. Each of the components of the imaging arrangement 100 is aligned along an imaging axis I, which is also identified by reference numeral 110. Imaging axis 110 is parallel to arrow A—A. The imaging axis 110 intersects an optical axis X, which is also identified by reference numeral 112.

Image sensor 102 is preferably a one-dimensional, solid-state image sensor which includes a solid-state image sensor array. The image sensor 102 is preferably a 1×1024 image sensor, i.e., an image sensor having one row of 1024 pixels and an imaging resolution of 1×1024, and characterized as a one-dimensional image sensor. The image sensor 102 provides superior resolution of the optical code or target whose transverse plane is correlated in space to one of the plurality of focal planes.

The optical element 104 is preferably capable of being moved via, for example, an actuator assembly (not shown), along imaging axis 110. The actuator may be an actuator as described in co-pending patent application assigned U.S. application Ser. No. 10/425,344 filed on Apr. 29, 2003, the contents of which are hereby incorporated by reference in their entirety. Other types of actuators known in the art are contemplated for use in moving the lens assembly. Optical elements of the optical element 104 may be, for example, glass, a prism, holographic optical elements, plastic, or other optical elements known to one having ordinary skill in the art. Optics assembly 106 preferably includes at least one objective lens. The at least one objective lens of the optics assembly 106 is a conventional objective lens.

Mirror assembly 108 preferably includes a motor assembly 114, such as a linear drive motor, operatively connected to a mirror 116 in a manner which causes mirror 116 to pivot about a central axis. It is contemplated that the axis about which mirror 116 pivots may be off center. The mirror 116 is therefore capable of reflecting an image of an optical target along optical axis 112. The optical target may be located at one of a plurality of focal planes such as, for example, the focal plane "FP" illustrated in FIG. 1. Thus, mirror 116 is designed to reflect the image which it receives from the optical axis 112. The image is reflected along the imaging axis 110, toward the optics assembly 106 which contains the objective lens, through the optical element 104, and finally the image is received by the image sensor 102.

The focal planes are preferably two-dimensional rectangular planes, however, it is contemplated that the optics assembly 106 and optical element 104 can include optics for creating and focusing onto the image sensor 102 three-dimensional focal planes, and/or focal planes having other types of geometric shapes, e.g., elliptical, circular, triangular, square, etc.

It is further contemplated that the optics create and focus focal planes (or portions thereof) having a slightly larger dimension or area than the image sensor 102. For example, if the image sensor 102 has a dimension of 1×1024, i.e., one pixel row, each focal plane has a dimension of 3×1024, such that at least a portion of the image corresponding to the focal plane overlays the pixel row of the image sensor 102.

Additionally, the motor assembly 114 is actuated to pivot the mirror 116 for imaging a two-dimensional optical target such as, or example, a PDF 417 code. The imaging arrangement 100 also preferably includes electronics which determine, by evaluating a portion of the optical target imaged onto the image sensor 102, whether the optical target is a two-dimensional target. If it is determined that the optical target is not a two-dimensional target, i.e., that the optical target is a one-dimensional target, then the motor assembly 114 is not actuated.

Upon determining that the optical target is a two-dimensional target, the electronics associated with the imaging arrangement actuate motor assembly 114 to pivot the mirror 116. As mirror 116 pivots, it scans the two-dimensional optical target from top-to-bottom and/or bottom-to-top. As the mirror 116 pivots, thereby reflecting the image of the optical target along optical axis 112, the two-dimensional optical target is imaged line by line onto the image sensor 102. The electronics contained within image sensor 102 generate a signal for each imaged line. The signals generated by the image sensor 102 are then transmitted to a processor device (not shown) for decoding. The decoding process is accomplished utilizing a decoding algorithm stored in memory associated with the processor device. The decoding algorithm may be a PDF 417 decoding algorithm. Alternatively, the processor device includes image processing capabilities and the optical target is something other than a two-dimensional optical code, such as, for example, a symbol, picture, etc.

Accordingly, imaging arrangement 100 is capable of analyzing signatures, pictures and imaging objects other than optical codes, such as produce stickers and photographs. In such applications, the motor 114 is actuated for pivoting the mirror 116 for analyzing a picture of a field of view or for imaging objects in the field of view by raster scanning the field of view line by line. Therefore, the imaging arrangement 100 can image, for example, a produce sticker and subsequently perform image processing to determine the type of produce and the costs associated with that particular type of produce. The processor utilizes application software and look-up tables and/or other data structures known to one having ordinary skill in the art, to make determinations based on the acquired data.

In accordance with an embodiment of the present invention, the objective lens contained within optics assembly 106 is configured to be movable along the imaging axis 110. The objective lens may be moved via an actuator (not shown) or other means known to one having ordinary skill in the art. Accordingly, the objective lens may be moved along the imaging axis 110 to aid in focusing the image of the optical target onto the image sensor 102. The motion of optics assembly 106 along the imaging axis 110 is preferably in the range of 0–100 micrometers.

Figure 1A:
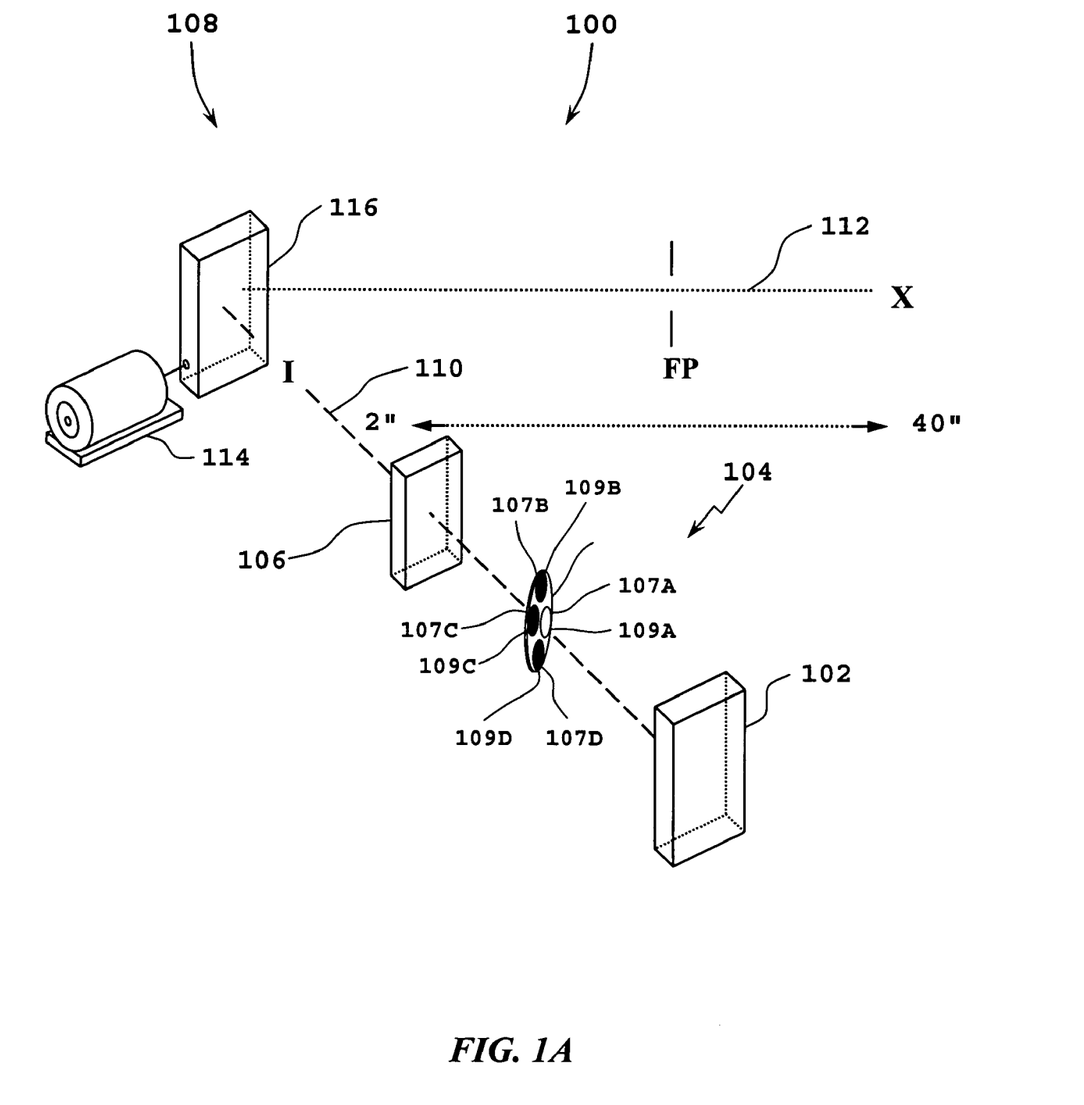
FIG. 1A is as schematic diagram illustrating an imaging arrangement in accordance with a second embodiment of the present disclosure.

In addition to focusing the image of the optical target onto the image sensor 102 by moving the objective lens along the imaging axis 110, the focusing function is also achieved by moving optical element 104 perpendicular to the imaging axis 110. Optical element 104 may be formed of material as simple as a section of glass having varied thickness along its longitudinal axis. As illustrated in FIG. 1A, optical element 104 may, alternatively, be configured as a rotatable carrier 105 having a plurality of openings 107A–D filled with glass segments 109A–D, wherein each of the glass segments has a different thickness. Additionally, one or more openings of the plurality of openings 107A–D may be empty, i.e., contain no glass or other lens material. Optical clement 104 may be configured in various configurations known to one having ordinary skill in the art.

Figure 1B:
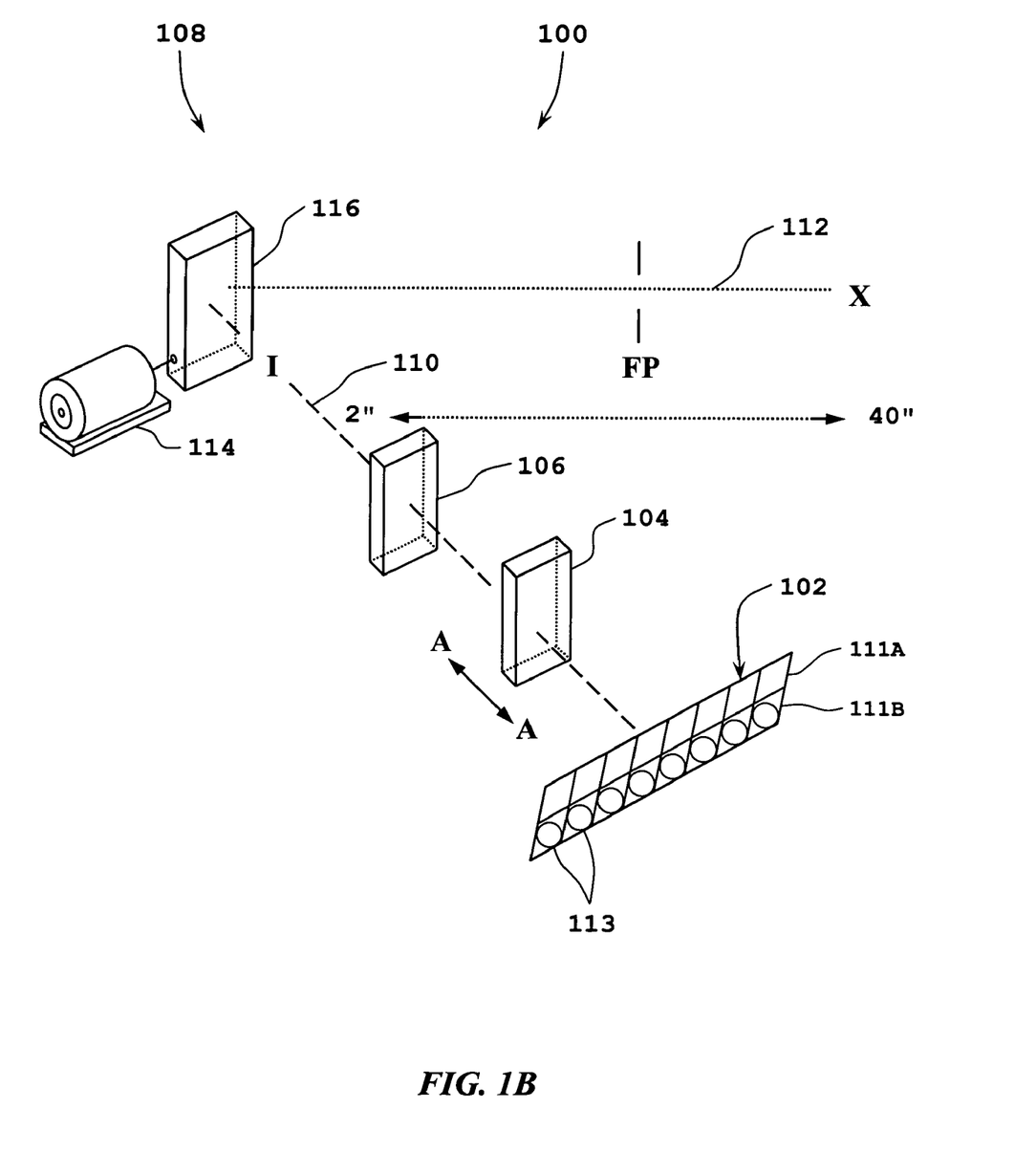
FIG. 1B is as schematic diagram illustrating an imaging arrangement in accordance with another embodiment of the present disclosure.

With reference to FIG. 1B, another embodiment of present disclosure is illustrated. The embodiment presented by FIG. 1B is similar to the embodiment illustrated in FIG. 1 and will only be discussed in detail to the extent necessary to identify differences in construction and/or operation. A one-dimensional image sensor typically contains one row of pixels and 1024 columns of pixels. In the embodiment illustrated in FIG. 1B, image sensor 102 is preferably a two-dimensional image sensor, such as, for example, an image sensor having two rows of pixels 111A, 111B and 1024 columns of pixels. The two-dimensional image sensor 102 is therefore capable of imaging more than one line of the optical target, simultaneously. The total number of lines that the image sensor is capable of imaging at one time is a function of the number of rows of pixels.

In accordance with yet another embodiment of the present invention, it is contemplated that at least one of the rows of pixels of the two-dimensional image sensor 102 may be overlaid with optical elements 113, as illustrated in FIG. 1B, for focusing an optical target located at a second set of focal planes which is different from a first set of focal planes the other row of pixels is designed for focusing. The electronics boused within image sensor 102 are configured to determine which of the rows more precisely focuses the optical target, and the image being focused on tat row is utilized to generate a signal which is transmitted to the processor.

In the case where the optical code or target is a one-dimensional barcode symbol, the optical code or target is determined to be adequately or substantially focused if a row of pixel data sensed by the image sensor array and corresponding to the barcode symbol is properly and accurately decoded by a decoder of a barcode imager (see FIG. 3) or imaging system. The barcode imager outputs a beep sound or other indication, as known in the art, indicating the barcode symbol was successfully decoded.

If the barcode symbol is not properly and accurately decoded, the actuator is actuated to obtain a different positional setting along the optical axis 112, in an effort to accurately or substantially focus the optical code or target onto the image sensor 102. The actuator is manually actuated by the operator, e.g., pressing a trigger button on a barcode imager (see FIG. 3), or automatically by a processor upon realizing the barcode symbol was not properly and accurately decoded.

Alternatively, if the barcode symbol is not properly and accurately decoded, the operator can manually change the distance between the lens assembly and the optical code or target by moving the imaging arrangement 100, and thus image the optical code or target at a different focal plane FP, until a successful read is indicated.

In the case where the optical code or target is a label, marking, picture, etc., the optical code or target is determined to be adequately or substantially focused if a row of pixel data sensed by the image sensor 102 and corresponding to the label, marking, picture, etc. is successfully processed in accordance with a particular application, such as an image processing and analysis application. If the barcode symbol is not successfully processed, the actuator is actuated to obtain a different positional setting along the optical axis 112, in an effort to accurately or substantially focus the optical code or target onto the image sensor 102. The actuator is manually actuated by the operator, e.g., pressing a trigger button on a barcode imager (see FIG. 3), or automatically by a processor upon realizing the barcode symbol was not successfully processed.

Alternatively, if the optical code or target is not successfully processed, the operator can manually change the distance between the lens assembly and the optical code or target by moving the imaging arrangement 100, and thus image the optical code or target at a different focal plane, until the imaged optical code or target is successfully processed.

It is provided that the label, marking, picture, etc. is generally larger in size, e.g., two-dimensional, than the one-dimensional image sensor 102. Accordingly, prior to initiating the processing of the row of pixel data corresponding to the label, marking, picture, etc., additional rows of pixel data are obtained corresponding to different portions of the label, marking, picture, etc. The additional rows of pixel data are obtained by imaging the label, marking, picture, etc. using a barcode imager (see FIG. 3) having the imaging arrangement 100 and operating in a continuous imaging mode and by manually moving the barcode imager in a top-down or bottom-up manner. As the barcode imager is moved, a plurality of rows of pixel data corresponding to the label, marking, picture, etc. are obtained.

Each row of pixel data obtained during the continuous imaging mode and corresponding to a different portion of the label, marking, picture, etc. is stored within a memory until the entire (or sufficient portion) of the label, marking, picture, etc. is imaged. The stored rows of pixel data are then processed by a processor, for example, by mapping or joining the various rows of stored pixel data to create the imaged label, marking, picture, etc. and then processing the mapped pixel data. A similar procedure is performed for imaging and decoding two-dimensional barcode symbols, such as barcode symbols of the PDF417 symbology, using the imaging arrangement 100.

Figure 2:
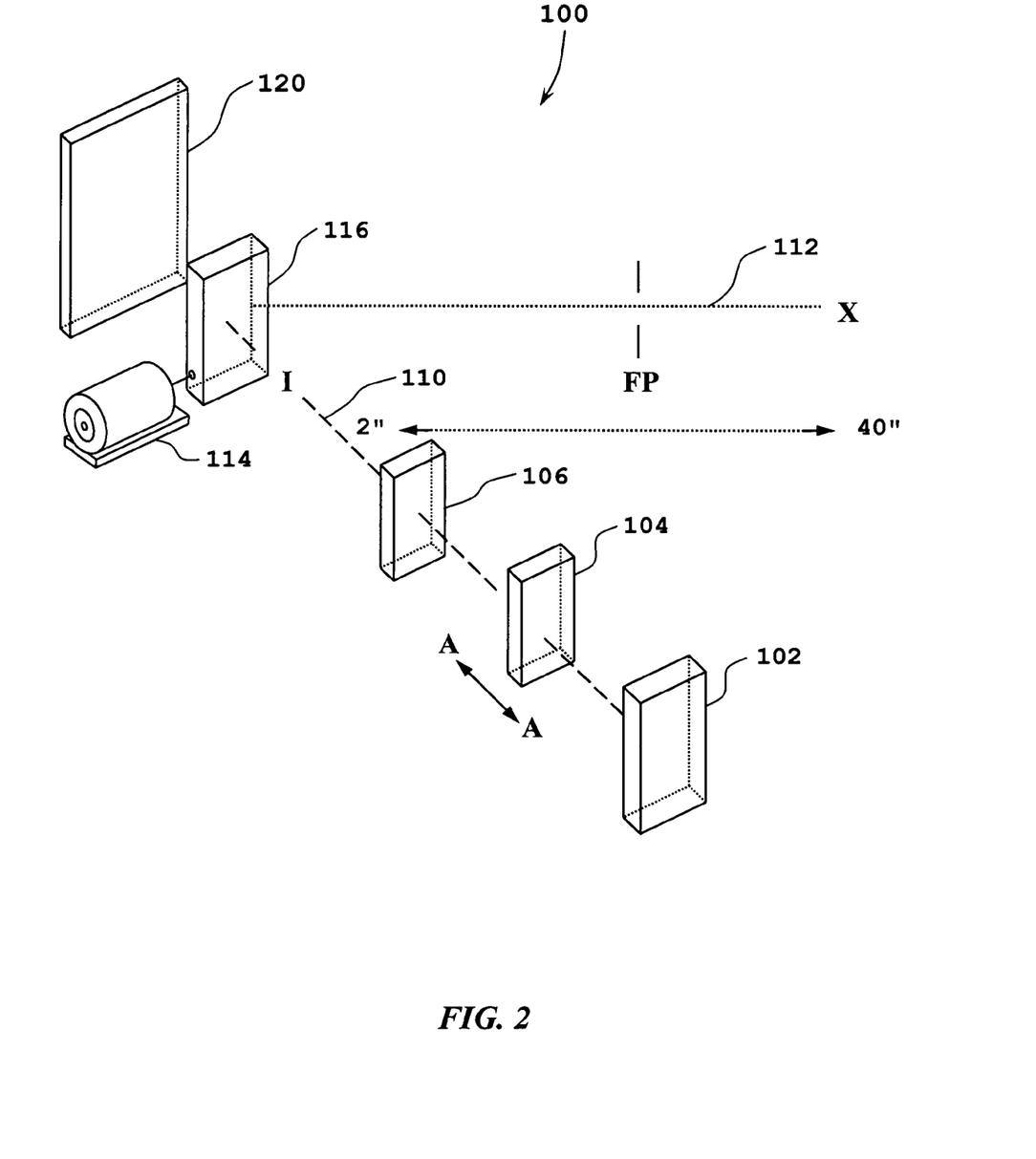
FIG. 2 is a schematic diagram illustrating an imaging arrangement in accordance with the present invention.

Referring now to FIG. 2, according to another embodiment of the present invention, at least one illumination device 120, such as, for example, an LED, laser, and flash-type module, is provided for illuminating the field of view of the imaging arrangement 100. The illumination device 120 may, alternatively, consist of an illumination printed circuit board and a lenslet plate. The illumination printed circuit board may include a plurality of light emitting diodes. In a preferred embodiment, multiple 660 nm light emitting diodes (LED) are arranged on the illuminator board. In an alternative embodiment, LEDs producing a higher or lower wavelength light may be employed. In either case, the LEDs are arranged in such a way that the target area is evenly illuminated. In systems where multiple fields of view and multiple focal lengths are selectable in the imaging engine, the illumination device 120 may provide different fields of illumination. Light emanating from the light emitting diodes is projected through apertures or lenslets in a front plate of an imaging engine.

The illumination device 120 may produce a relatively broad beam of lower output intensity to illuminate a target barcode relatively close to the imaging optical code reader, and a relatively narrower beam of higher output intensity to illuminate a target barcode relatively far from the reader. A portion of the illumination device 120 for producing the lower output intensity illumination beam may comprise one or more light emitting elements with a wide divergence pattern located relatively near a principle optical axis of the lens assembly. Additional elements may be used to provide a longer range illumination beam of higher output intensity. In a preferred embodiment, this function is performed by light emitting elements with a narrow divergence pattern located relatively farther from a principle optical axis of the imaging arrangement 100. These latter elements may be plural light emitting diodes each associated with a focusing lens located in a front face of an imaging engine.

In an illumination arrangement using a plurality of light emitting elements, certain intensity variations may occur across the illuminated field. In preferred embodiments of the present invention, image processing circuits and/or software compensates signals from the image sensor for known variations in illumination provided by the illumination device 120.

For example, it is preferable that the illuminating device 120 includes a first and a second illuminating device. Only one of the first and second illuminating devices is activated if it is determined by the electronics that the optical target is a one-dimensional optical target. However, both the first and second illuminating devices are activated, if it is determined by the electronics that the optical target is a two-dimensional optical target.

According to another embodiment of the invention, the at least one illuminating device 120 is mounted or affixed adjacent to the pivoting mirror 116 for illuminating the field of view along optical axis 112 from top-to-bottom or bottom-to-top as the pivoting mirror 116 pivots from top-to-bottom or bottom-to-top, respectively. It is further contemplated that the at least one illuminating device 120 can be used to assist in aiming or targeting the optical target or other object to be imaged prior to imaging.

In the embodiments disclosed herein, the working range of the imaging arrangement 100 is in the range of about 2 to about 40 inches, which is considerably greater than the working range of conventional laser-based optical code scanners. Accordingly, incorporating the imaging arrangement 100 of the various embodiments disclosed herein within an imaging engine for an optical code imager, the performance of the optical code imager is significantly greater than conventional laser-based optical code scanners at least with respect to imaging and decoding all one-dimensional symbologies and at least the PDF417 two-dimensional symbology.

Figure 3:
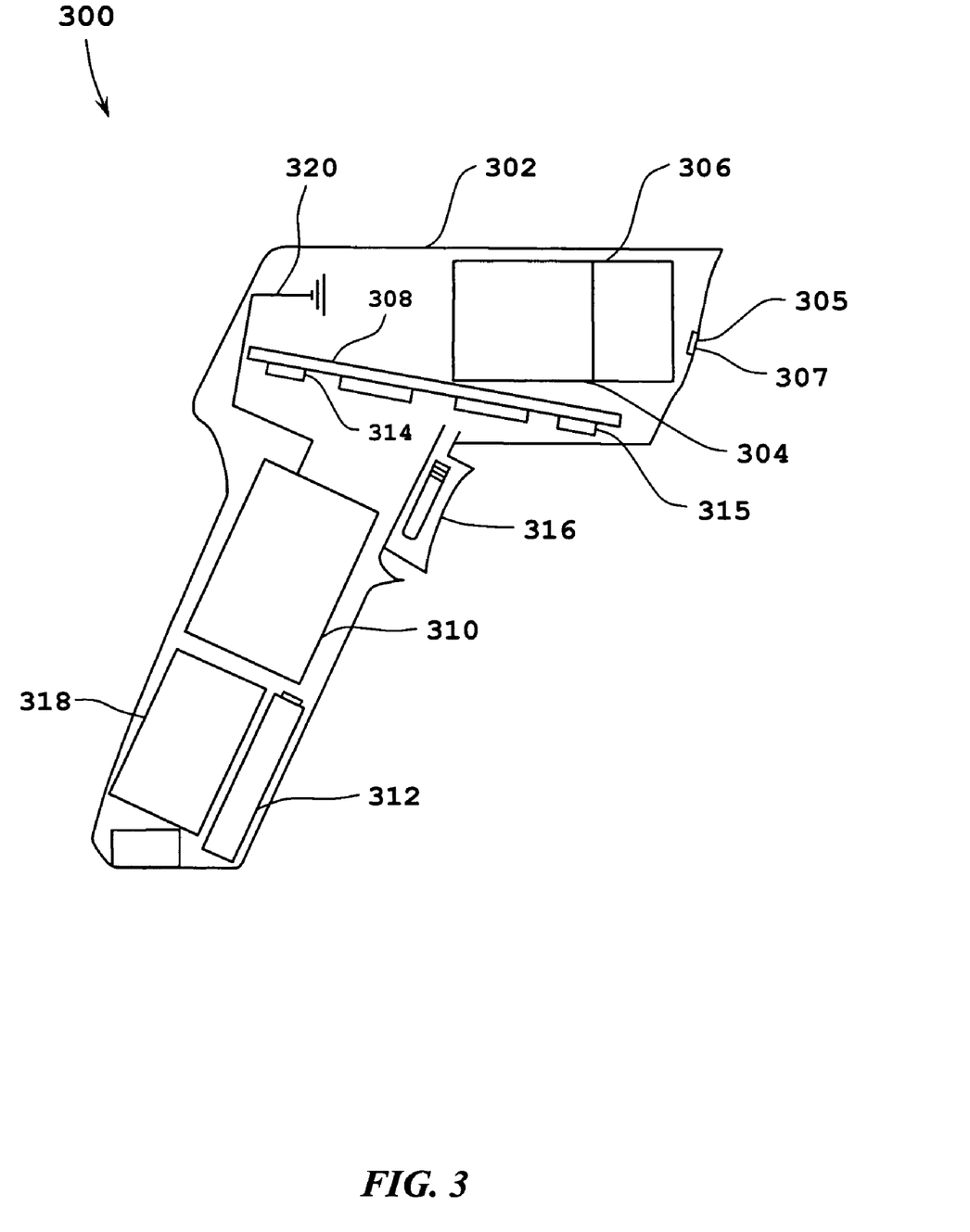
FIG. 3 is a side view in cross-section of a barcode imager in accordance with the present invention.

The imaging arrangements of the embodiments described above can be incorporated in a variety of imaging devices where an inexpensive, non-complex imaging arrangement providing an extended working range (i.e., greater than 61 cm or 24 inches) is advantageous. One such imaging device is an image-based barcode imager as shown in FIG. 3 and designated generally by reference numeral 300.

The barcode imager 300 includes a handheld barcode imager 302 housing one of the imaging arrangements described above and referred to by reference numeral 304. The handheld barcode imager 302 also houses an illumination source 306 having at least one LED or other light generating device, an aiming source 305 having a laser diode 307 for aiming a laser beam at the optical code or target to be imaged, control circuitry 308, communication circuitry 310 and a battery 312 for wireless operation. Alternatively, the barcode imager 300 may be designed for non-wireless operation.

The control circuitry 308 includes a processor 314 for controlling several functions associated with the operation of the barcode imager 300. Those functions include actuating an image and decode process upon a user pressing a trigger button 316, actuating an actuator and/or motor, and controlling the illumination source 306. The aiming source 305 and communication circuitry 310 are configured to provide feedback to processor 314 to allow processor 314 to determine whether an optical code or target is adequately or substantially focused. The processor is also configured to perform the functions of operating the barcode imager 300 in the continuous imaging mode, executing a set of programmable instructions for decoding the imaged optical code or target or controlling operation of a decoder 318 for decoding the imaged optical code or target, and executing a set of programmable instructions for processing the imaged optical code or target. The decoder 318 can be external to the processor 314 as shown in FIG. 3 or resident within the processor 314.

The control circuitry 308 further includes a memory 315 for storing rows of pixel data. The memory 315 can be external to the processor 314 as shown in FIG. 3 or resident within the processor 314.

The communication circuitry 310 includes an antenna 320 for outputting data indicative of the decoded and/or processed optical code or target to an external computing device, and for inputting data, such as data for changing at least one operational parameter of the barcode imager 300 as known in the art. The operational parameters can also be changed by imaging an optical code or target corresponding to at least one operational parameter and decoding and/or processing the imaged optical code or target, and subsequently changing the at least one operational parameter indicative of the decoded and/or processed optical code or target.

Figure 4:
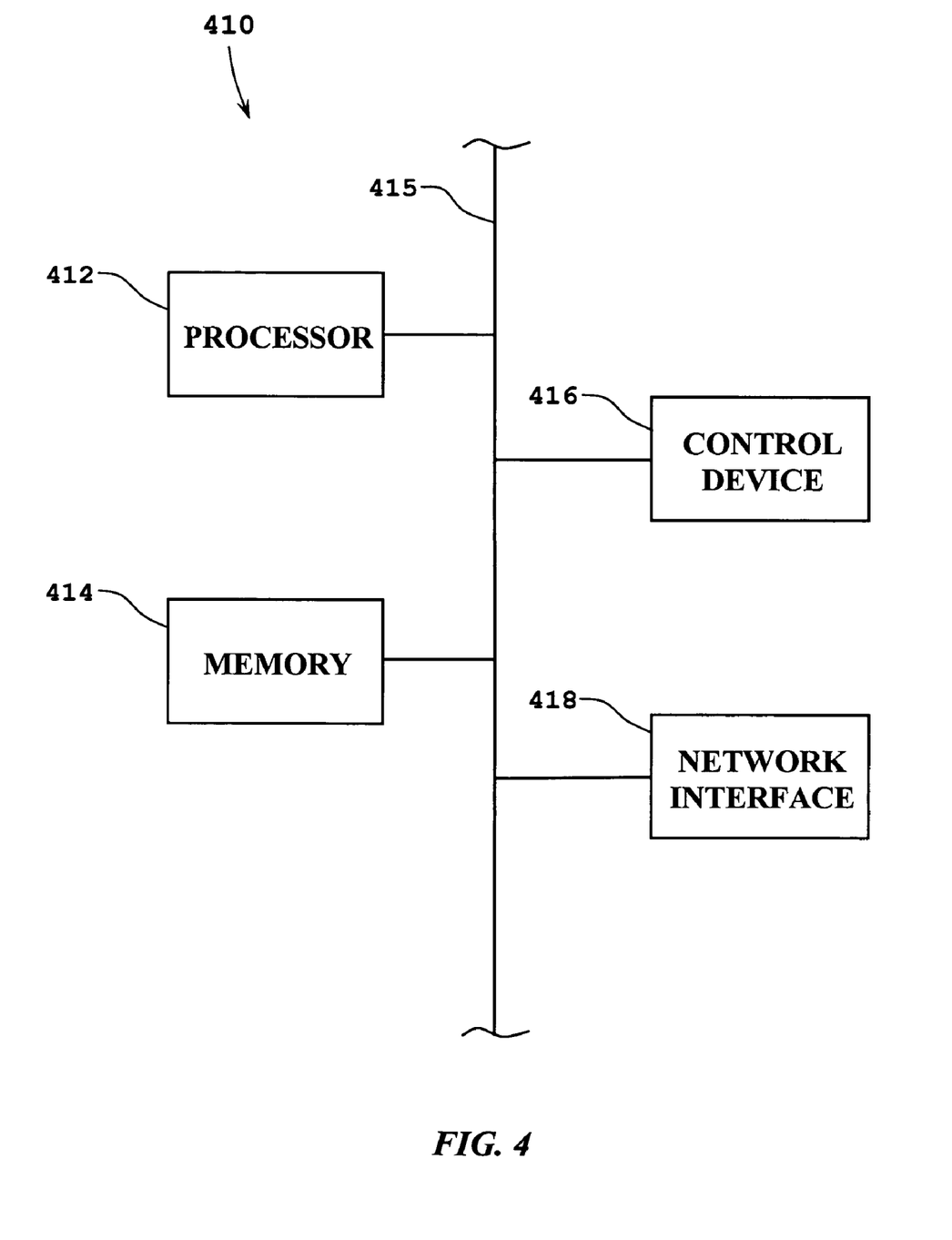
FIG. 4 is a block diagram illustrating a processing device for use in accordance with an embodiment of the present invention.

FIG. 4 shows an example of a processing device 410 that may be used to implement, e.g., a program for performing image processing to determine the type of produce and the costs associated with that particular type of produce, as described above with reference to FIG. 1. The device 410 includes a processor 412 and a memory 414 which communicate over at least a portion of a set 415 of one or more system buses. Also utilizing at least a portion of the set 415 of system buses are a control device 416 and a network interface device 418. The device 410 may represent, e.g., portions or combinations of the image sensor electronics or any other type of processing device for use in implementing at least a portion of the process in accordance with the present invention. The elements of the device 410 may correspond to conventional elements of such devices.

For example, the processor 412 may represent a microprocessor, central processing unit (CPU), digital signal processor (DSP), or application-specific integrated circuit (ASIC), as well as portions or combinations of these and other processing devices. The memory 414 is typically an electronic memory, but may comprise or include other types of storage devices, such as disk-based optical or magnetic memory. The control device 416 may be associated with the processor 412. The control device 416 may be further configured to transmit control signals.

The imaging techniques described herein may be implemented in whole or in part using software stored and executed using the respective memory and processor elements of the device 410. For example, the process for determining which of the rows provides more precise focus for the optical target may be implemented at least in part using one or more software programs stored in memory 414 and executed by processor 412. The particular manner in which such software programs may be stored and executed in device elements such as memory 414 and processor 412 is well understood in the art and therefore not described in detail herein.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. An imaging arrangement for imaging an optical code or target at a plurality of focal planes comprising:

at least one image sensor each having at least one row of pixels for obtaining at least one row of pixel data corresponding to an image focused thereon;

at least one objective lens positioned along an imaging axis of the imaging arrangement for focusing an image of the optical code or target on the at least one image sensor for obtaining at least one row of pixel data corresponding to at least a portion of the optical code or target;

a mirror positioned adjacent a point defined by an intersection of the imaging axis and an optical axis, wherein the mirror reflects the image received from the optical axis, along the imaging axis toward the optics assembly and the image sensor, wherein the optical axis is defined as a straight path extending between the optical code or target and the mirror;

at least one moveable optical element positioned between the at least one objective lens and the at least one image sensor;

a motor assembly operatively coupled to the mirror for pivoting the mirror for imaging a field of view; and an illumination device positioned in proximity to the mirror for illuminating a field of view of the imaging arrangement from top-to-bottom or bottom-to-top as the mirror pivots from top-to-bottom or bottom-to-top, respectively.

2. The imaging arrangement according to claim 1, wherein the optical code or target is selected from the group consisting of a barcode symbol, a signature, a label, a marking, and a picture.

3. The imaging arrangement according to claim 2, wherein the barcode symbol is one of a one-dimensional and a two-dimensional barcode symbol.

4. The imaging arrangement according to claim 1, wherein the imaging arrangement has a working range of approximately 5 cm to 102 cm.

5. The imaging arrangement according to claim 1, wherein the optics assembly is moved in the range of 0–100 µm by an actuator.

6. The imaging arrangement according to claim 1, wherein the at least one movable optical element is configured to move in a direction which is substantially perpendicular to the imaging axis.

7. The imaging arrangement according to claim 1, wherein a plane of the optical code or target is correlated in space to at least one of the plurality of focal planes.

8. An imaging arrangement for imaging an optical code or target at a plurality of focal planes, comprising:

at least one image sensor each having at least one row of pixels for obtaining at least one row of pixel data corresponding to an image focused thereon;

an optics assembly having at least one objective lens positioned along an imaging axis of the imaging arrangement For focusing an image of the optical code or target on the at least one image sensor for obtaining at least one row of pixel data corresponding to at least a portion of the optical code or target;

a mirror positioned adjacent a point defined by an intersection of the imaging axis and an optical axis, wherein the mirror reflects the image received from the optical axis, along the imaging axis toward the optics assembly and the image sensor;

wherein the lens assembly includes a plurality of optical elements for further focusing the image on the at least one image sensor; and a carrier defining a plurality of openings, wherein each of the plurality of optical elements is disposed within a corresponding one of a plurality of openings defined within a rotatable carrier, wherein one of the plurality of openings is an empty opening and does not include an optical element, and further wherein a motor is operatively coupled to the rotatable carrier for positioning the empty opening or one of the plurality of optical elements along the optical axis.

9. A barcode imager for imaging an optical code or target at a plurality of focal planes comprising:

means for initiating an imaging operation for imaging the optical code or target at at least one of the plurality of focal planes;

an imaging arrangement comprising:

at least one image sensor each having at least one row of pixels for obtaining at least one row of pixel data corresponding to an image focused thereon;

an optics assembly having at least one objective lens positioned along an imaging axis of the imaging arrangement for focusing an image of the optical code or target on the at least one image sensor for obtaining at least one row of pixel data corresponding to at least a portion of the optical code or target; and a mirror assembly positioned adjacent a point defined by an intersection of the imaging axis and an optical axis, wherein the mirror assembly reflects the image received from the optical axis, along the imaging axis toward the optics assembly and the image sensor;

at least one processor configured for determining whether at least one row of pixel data can be decoded and/or processed;

decoding and/or processing a row of pixel data if it is determined that at least one row of pixel data can be decoded and/or processed, wherein the processor is further configured for:

moving the at least one objective lens if it is determined that at least one row of pixel data cannot be decoded and/or processed; and repeating the initiating, obtaining and determining steps, and one of the decoding and moving steps, until the at least one row of pixel data is decoded and/or processed.

10. The barcode imager according to claim 9, wherein the optical code or target is selected from the group consisting of a barcode symbol, a signature, a label, a marking, and a picture.

11. The barcode imager according to claim 10, wherein the barcode symbol is one of a one-dimensional and a two-dimensional barcode symbol.

12. The barcode imager according to claim 9, wherein the imaging arrangement has a working range of approximately 5 cm to 102 cm.

13. The barcode imager according to claim 9, wherein the imaging arrangement further comprises a motor assembly operatively coupled to the mirror for pivoting the mirror for imaging a field of view.

14. The barcode imager according to claim 13, wherein the optics assembly is moved in the range of 0–100 µm by an actuator.

15. The barcode imager according to claim 9, wherein the lens assembly includes a plurality of optical elements for further focusing the image on the at least one-dimensional image sensor array.

16. The barcode imager according to claim 15, wherein the plurality of optical elements are selected from the group consisting of glass, lens, holographic optical elements, plastic, and other transparent materials.

17. The barcode imager according to claim 15, wherein the plurality of optical elements overlay at least a portion of the at least one image sensor.

18. The barcode imager according to claim 15, wherein at least one of the plurality of optical elements is configured to move in a direction which is substantially perpendicular to the imaging axis.

19. The barcode imager according to claim 9, further comprising:
a memory for storing rows of pixel data corresponding to different portions of the optical code or target; and
a processor for processing the stored rows of pixel data.

20. The barcode imager according to claim 9, further comprising means for focusing different sets of the plurality of focal planes on the at least one imager sensor.

21. A method for imaging an optical code or target at a plurality of focal planes comprising the steps of:
initiating an imaging operation for imaging the optical code or target at least one of the plurality of focal planes onto at least one image sensor via at least one objective lens;
determining whether the optical code or target is one-dimensional or two-dimensional;
obtaining at least one row of pixel data corresponding to the optical code or target during the imaging operation;
positioning at least one optical element between the at least one objective lens and the at least one-dimensional image sensor array; and
providing a carrier defining a plurality of openings, wherein each of the plurality of optical elements is disposed within a corresponding one of a plurality of openings defined within a rotatable carrier.

22. The method according to claim 21, further comprising the step of pivoting a mirror to scan the optical code or target wherein it is determined that the optical code or target is two-dimensional.

23. The method according to claim 21, further comprising the steps of:
determining whether at least one row of pixel data can be decoded and/or processed; and
decoding and/or processing a row of pixel data if it is determined that at least one row of pixel data can be decoded and/or processed.

24. The method according to claim 23, further comprising the steps of:
moving the at least one objective lens if it is determined that at least one row of pixel data cannot be decoded and/or processed; and
repeating the initiating, obtaining and determining steps, and one of the decoding and moving steps, until the at least one row of pixel data is decoded and/or processed.

25. The method according to claim 21, further comprising the steps of:
moving the at least one objective lens;
repeating the initiating, obtaining and moving steps, until the at least one objective lens has been moved through every position; and
decoding and/or processing at least one row of obtained pixel data.

26. The method according to claim 21, further comprising the steps of:
storing the row of pixel data;
repeating the initiating and storing steps until a plurality of rows of pixel data corresponding to the optical code or target are stored; and
decoding and/or processing the plurality of stored rows of pixel data.

27. The method according to claim 21, wherein the optical code or target is selected from the group consisting of a barcode symbol, a label, a marking, and a picture.

28. The method according to claim 21, wherein the barcode symbol is one of a one-dimensional and a two-dimensional barcode symbol.

29. The method according to claim 21, wherein one of the plurality of openings is an empty opening and does not include an optical element, and further wherein a motor is operatively coupled to the rotatable carrier for positioning the empty opening or one of the plurality of optical elements along the optical axis.

30. A method for imaging an optical code or target at a plurality of focal planes comprising the steps of:
initiating an imaging operation for imaging the optical code or target at least one of the plurality of focal planes onto at least one image sensor via at least one objective lens;
determining whether the optical code or target is one-dimensional or two-dimensional;
obtaining at least one row of pixel data corresponding to the optical code or target during the imaging operation;
determining whether at least one row of pixel data can be decoded and/or processed;
decoding and/or processing a row of pixel data if it is determined that at least one row of pixel data can be decoded and/or processed;
moving the at least one objective lens if it is determined that the at least one row of pixel data cannot be decoded and/or processed; and
repeating the initiating, obtaining and determining steps, and one of the decoding and moving steps, until the at least one row of pixel data is decoded and/or processed.

31. The method according to claim 30, further comprising the step of positioning at least one optical element between the at least one objective lens and the image sensor array.

32. A method for imaging an optical code or target at a plurality of focal planes comprising the steps of:
initiating an imaging operation for imaging the optical code or target at least one of the plurality of focal planes onto at least one image sensor via at least one objective lens;
determining whether the optical code or target is one-dimensional or two-dimensional;
obtaining at least one row of pixel data corresponding to the optical code or target during the imaging operation;
moving the at least one objective lens;
repeating the initiating, obtaining and moving steps, until the at least one objective lens has been moved through every position; and
decoding and/or processing at least one row of obtained pixel data.

33. The method according to claim 32, further comprising the step of positioning at least one optical element between the at least one objective lens and the at least one-dimensional image sensor array.

34. A method for imaging an optical code or target at a plurality of focal planes comprising the steps of:
initiating an imaging operation for imaging the optical code or target at least one of the plurality of focal planes onto at least one image sensor via at least one objective lens;
determining whether the optical code or target is one-dimensional or two-dimensional;
obtaining at least one row of pixel data corresponding to the optical code or target during the imaging operation;
storing the row of pixel data;

repeating the initiating and storing steps until a plurality of rows of pixel data corresponding to the optical code or target are stored; and decoding and/or processing the plurality of stored rows of pixel data.

35. The method according to claim 34, further comprising the step of positioning at least one optical element between the at least one objective lens and the at least one-dimensional image sensor array.

36. A bar code imager for imager an optical code or target at a plurality of focal planes comprising:

means for initiating an imaging operation for imaging the optical code or target at least one of the plurality of focal planes;

an imaging arrangement comprising:

at least one image sensor each having at least one row of pixels for obtaining at least one row of pixel data corresponding to an image focused thereon;

at least one objective lens positioned along an imaging axis of the imaging arrangement for focusing an image of the optical code or target on the at least one image sensor for obtaining at least one row of pixel data corresponding to at least a portion of the optical code or target;

a mirror positioned adjacent a point defined by an intersection of the imaging axis and an optical axis, wherein the mirror reflects the image received from the optical axis, along the imaging axis toward the optics assembly and the image sensor;

at least one moveable optical element positioned between the at least one objective lens and the at least one image sensor;

a motor assembly operatively coupled to the mirror for pivoting the mirror for imaging a field of view;

an illumination device positioned in proximity to the mirror for illuminating a field of view of the imaging arrangement from top-to-bottom or bottom-to-top as the mirror pivots from top-to-bottom or bottom-to-top, respectively;

at least one processor configured for determining whether at least one row of pixel data can be decoded and/or processed; and decoding and/or processing a row of pixel data if it is determined that at least one row of pixel data can be decoded and/or processed.

37. The imaging arrangement according to claim 36, wherein the optical code or target is selected from the group consisting of a barcode symbol, a signature, a label, a marking, and a picture.

38. The imaging arrangement according to claim 37, wherein the barcode symbol is one of a one-dimensional and a two-dimensional barcode symbol.

39. The imaging arrangement according to claim 36, wherein the imaging arrangement has a working range of approximately 5 cm to 102 cm.

40. The imaging arrangement according to claim 36, wherein the optics assembly is moved in the range of 0–100 µm by an actuator.

* * * * *